United States Patent [19]

Ertle

[11] 4,412,978
[45] Nov. 1, 1983

[54] METHOD AND APPARATUS FOR MANUFACTURING IMPROVED PUFFED BORAX

[75] Inventor: Raymond T. Ertle, Pompton Plains, N.J.

[73] Assignee: Stokely-Van Camp, Inc., Indianapolis, Ind.

[21] Appl. No.: 358,050

[22] Filed: Mar. 15, 1982

[51] Int. Cl.³ .............................................. C01B 35/12
[52] U.S. Cl. ............................... 423/279; 252/378 R; 252/135; 34/57 R
[58] Field of Search ................... 423/279; 252/378 R, 252/135; 34/57 R

[56] References Cited

U.S. PATENT DOCUMENTS

| | | | |
|---|---|---|---|
| 2,139,378 | 12/1938 | Myers et al. | 252/378 R |
| 2,550,877 | 5/1948 | Stafford et al. | 252/378 P |
| 2,941,947 | 6/1960 | Schauer | 252/135 |
| 3,309,170 | 3/1967 | Griswold | 423/279 |
| 3,454,357 | 7/1969 | Rhees et al. | 423/279 |
| 3,882,034 | 5/1975 | Gibbons | 423/279 |
| 3,986,987 | 10/1976 | D'Souza | 252/135 |
| 4,031,354 | 6/1977 | D'Souza | 423/279 |

OTHER PUBLICATIONS

Rhees, "Puffed Borax", *Soap and Chemical Specialties*, Jan. 1966, pp. 59-61 and 118-120.

*Primary Examiner*—Herbert T. Carter
*Assistant Examiner*—Jackson Leeds
*Attorney, Agent, or Firm*—Weingram & Klauber

[57] ABSTRACT

A method and apparatus for producing a puffed borax product having superior particle strength and improved uniformity of hydration and puff ratio. In the method particles of borax having a given particle size distribution are introduced into a downwardly flowing slowly moving laminar air stream in a vertical tower, as a horizontally dispersed sheet of particles. The air stream is heated sufficiently to remove part of the water of hydration without fusing the borax. The borax particles, carried by the air stream, are gravitationally separated downstream, and are found to have a more uniform puffing ratio, i.e. feed particles of different sizes are puffed more proportionally than in prior art processes.

An apparatus for carrying out this method is also disclosed, which comprises a vertical tower with an input for heated air and an opening in the wall of the tower through which the borax feed is introduced as a dispersed sheet. The borax feed is introduced by one or more rotating horizontal wheels having vanes which disperse the particles through the opening into the moving air stream as a sheet of particles, which are carried along by the air stream and are separated gravitationally downstream from the point of entry.

16 Claims, 8 Drawing Figures

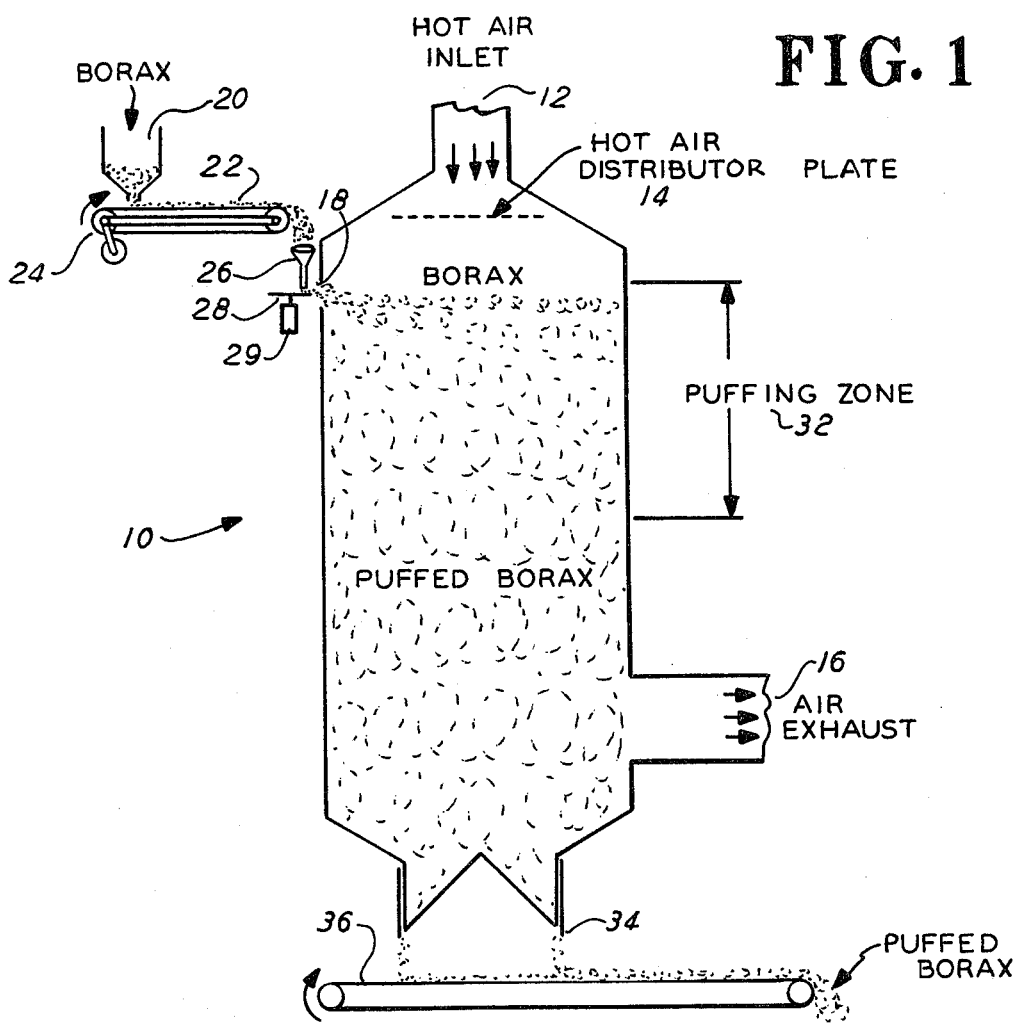
FIG. 1
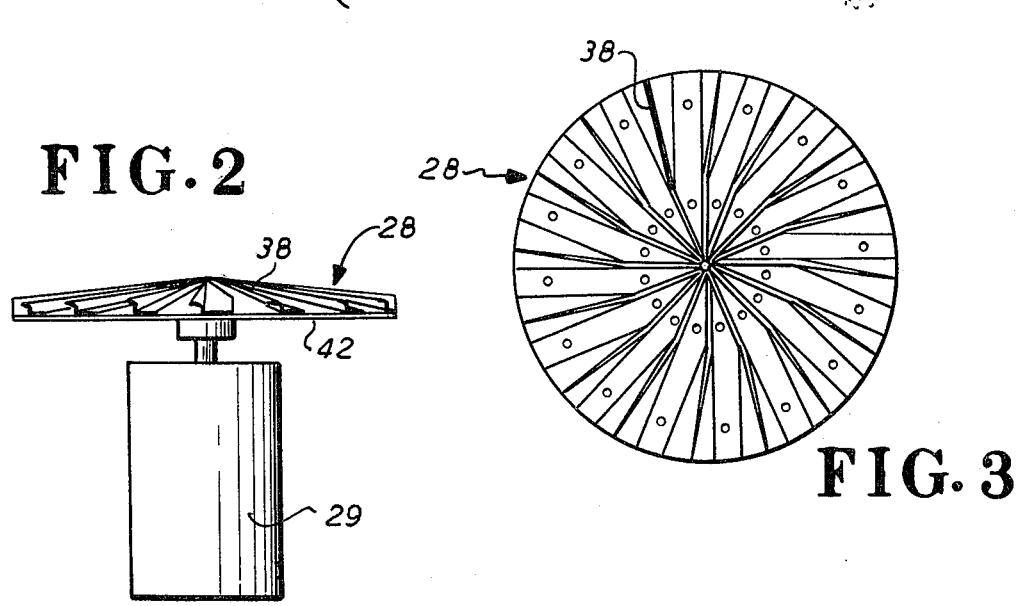
FIG. 2
FIG. 3

A = PUFFED BORAX
0.32 g/cc DENSITY

C = PUFFED BORAX
0.07 g/cc DENSITY

METHOD AND APPARATUS FOR MANUFACTURING IMPROVED PUFFED BORAX

BACKGROUND OF INVENTION

1. Field of Invention

This invention relates generally to method and apparatus for producing puffed borax, and more specifically relates to a method and apparatus for producing a puffed borax product having superior particle strength and improved uniformity of hydration and puff ratio.

2. Prior Art

The preparation, properties, and uses of expanded or so-called "puffed" borax, have been described in numerous places in the literature. Excellent such discussions are set forth, e.g. in *Technical Service Bulletin, No. 27*, (revised September 1971) of Borax Consolidated Limited of London, England; in Bulletin 0171, entitled "Puffed Borax", issued October, 1973 by Kerr-McGee Chemical Corporation, Oklahoma City, OK; and in an article by R. C. Rhees and H. H. Hammar entitled "Puffed Borax", appearing in *Soap and Chemical Specialities*, Vol. XLII for January, 1966, at pages 58–61 and 118–120.

Among other things, these references describe known, prior art processes wherein particulate borax pentahydrate particles are rapidly heated to above the melting temperature of the pentahydrate, whereat the borate dissolves in its own water of hydration and the solution erupts through the partially dehydrated crystal surface, resulting in the puffed product.

The resultant puffed product thus consists of low density particles or "beads", which have high surface area and include large quantities of voids. By virtue of such structure, large quantities of liquids and/or solids can be loaded onto the expanded borax, rendering such product useful as a bulk carrier in numerous applications. For example, organics such as trichloroethylene, cyclohexanone and pentachlorophenol can be loaded at very high percentages onto the puffed borax, as can non-ionic, cationic and anionic surfactants, with the product yet retaining its free-flowing characteristics. This renders the puffed borax very useful in such diverse compositions as dairy cleaners, fabric softeners, bath additives, etc.

Various techniques have been utilized in the past to effect the desired heating of the borax feed material. U.S. Pat. No. 4,031,354 to D'Souza, for example, describes a rotary inclined tubular drier into which granular borax is fed at its higher end and puffed borax is discharged from the lower end. A countercurrent flow of dry air is maintained in the drier. Borax is prevented from adhering to the interior of the tube by an adjustable spring-loaded scraper. In this process, undesirable agglomerates tend to be formed.

British Pat. No. 629,171 describes a process of preparing anhydrous borax by calcining borax containing water of hydration in a long vertical tube furnace, the powder falling down the tube in a counter-current of hot gases which are introduced tangentially slightly above the bottom the furnace. This process utilizes gases heated to as much as 1365° F., and produces a melted anhydrous borax, i.e., borax from which all water of hydration is removed, rather than puffed borax which retains water of hydration.

A considerable portion of the puffed borax presently manufactured in the U.S. has been produced by use of the so-called "borax gun," one type of which is disclosed in U.S. Pat. No. 3,454,357, to R. C. Rhees and H. N. Hammar. This device consists of a central firing chamber, typically about 3½ feet long and several inches in diameter, through which hot gasses are passed in a given direction, with the gasses exiting through a venturi nozzle at the far end of the chamber. Compressed air is passed about the chamber periphery, which itself is mounted coaxially within a larger chamber or tube. At the venturi zone, sodium borate is deposited by gravity or other feed means. The borax particles are mixed at this venturi zone with the hot gases and carried through a further length of the enveloping tube, for a relatively short distance. Since the puffing zone (which extends from the venturi zone) in this device is of very small diameter—typically of several inches; and since the borax is introduced at the venturi zone, there is a tendency for turbulence to be present, and this introduces considerable grinding or attrition of the borax particles during the puffing process. For these and other reasons, it is found that the product produced by this type of gun includes a large number of fractured particles. The said product is accordingly found to have poor flow characteristics, and a mass of the material exhibits a comparatively high angle of repose. The presence of large numbers of fractured or partially fractured particles also leads to increased particle attrition in shipment and handling.

Perhaps because of the said turbulence, or due to other factors in the geometry of the foregoing Rhees et al apparatus, the particles of the product are further found to display a lack of uniformity in puffing ratio. By "puffing ratio" is meant the ratio between the diameter of the puffed particle and the diameter of the original feed particle which yields the puffed particle. This result is well appreciated in the prior art. See for example FIG. 1 of the aforementioned bulletin No. 171 and FIG. 11 of the Rhees and Hammar article in *Soap and Chemical Specialties*, wherein size distribution curves show the change in size distribution which typically results from manufacture of puffed borax by prior art methods.

Commercially available borax used as the feed for production of puffed borax is, of course, composed of particles of varying sizes. A principal reason for the change in particle size distribution in the puffed product, as is pointed out in the said references, is that by the methodologies heretofore utilized, smaller particles in the feed material tend to be preferentially puffed. This result is highly significant in that the tendency for finer feed particles to be puffed to a greater extent than larger particles, while it leads to a greater uniformity in size distribution, produces a product which for a desired average density includes high percentages of weaker highly puffed particles along with the denser less puffed particles. This type of particle population is more prone to break down by attrition when handled as during shipping. This is in contrast to a particle population wherein a relatively uniform puffing ratio is present.

The preferential puffing which occurs in Rhees et al has a further detrimental effect, in that the more highly puffed particles lose more water of hydration than the less-puffed particles. The resulting variation in state of hydration within the product renders same less suitable for use as a carrier for aqueous liquids.

It may further be pointed out that the venturi effect which is utilized in the aforementioned puffing guns, creates turbulence and undesired attrition grinding, and results in the production of fines in the resulting product. Indeed, examination of typical product yielded by use of the said gun, will reveal that same is rarely a free-flowing material—but rather contains a high percentage of dust-like material.

Yet a further difficulty with the gun-type apparatus exemplified by Rhees et al, is that turbulence generated by the venturi tends to cause uneven and unpredictable heating of the borax particles.

In U.S. Pat. No. 3,882,034, to E. J. Gibbons, a process and apparatus is described for producing puffed borax by use of a spray tower. In this instance, the borax feed material is introduced downwardly into an upwardly moving air stream. This approach while remedying some of the difficulties caused by the turbulence in gun-type apparatus, has the important disadvantage that the smaller, i.e. the lighter feed particles, which are acted upon to a greater extent by the counterflowing air stream than are the larger heavier particles, have a consequent much longer residence time in the puffing zone than do the heavier particles. This leads to precisely the undesired result which is above discussed, i.e., a preferential puffing of the smaller particles. Also to be noted, is that this tendency to preferentially over-puff small particles leads to a nonuniformity of dehydration, since in addition to over-puffing, these smaller feed particles are excessively dehydrated in comparison to the dehydration of the larger particles.

In accordance with the foregoing, it may therefore be regarded as an object of the present invention, to provide a process for manufacture of puffed borax, which produces a free-flowing, agglomerate-free, puffed borax product, which is less prone to particle attrition during shipping and handling.

A further object of the invention is to provide a process for preparing a free-flowing, agglomerate-free, puffed borax product, in which particles of borax of different sizes are puffed in a more uniform ratio, resulting in particle size distribution (PSD) curves in the puffed product which are substantially similar in shape to the PSD curves for the feed borax.

A still further object of the invention, is to provide a process for puffing a particulate borax feed stock, which avoids overheating and overpuffing of the smaller-sized particles of the borax feed, thereby assuring that such particles when puffed retain fully adequate strength and porosity.

A yet further object of the invention is to provide a process for manufacture of puffed borax from particulate borax feed, wherein the particles in the resultant product have relatively uniform water of hydration; and wherein smaller particles are not overdehydrated.

Another object of the invention is to provide a more economical apparatus and process for producing a free-flowing, agglomerate-free, puffed borax product, which has uniformly high bead strength.

A still further object of the invention is to provide apparatus for producing a free-flowing, agglomerate free puffed borax product requiring only readily available components.

SUMMARY OF THE INVENTION

These and further objects of the invention, as may appear as the specification progresses, are realized, in accordance with the invention, which as briefly stated, involves introducing particles of borax having a given particle size distribution into a downwardly flowing, slowly moving, laminar air stream in a vertical tower, as a horizontally dispersed sheet of particles. The vertical tower is essentially a conventional spray drying tower which has been suitably modified for use in the present process. The air stream is heated sufficiently to remove part of the water of hydration, but not to such degree as would completely remove the water of hydration or fuse the borax. The borax particles, carried by the air stream, are carried downstream and gravitationally separated, and are found to have a more uniform puffing ratio.

In an ideal case the particle size distribution curve of the puffed, or partially dehydrated particles, will have substantially the shape of the PSD curve for the unpuffed, or original feed particles—i.e. ideally the puffing ratio for all particles will be uniform. Pursuant to the present invention, a more uniform puffing ratio is achieved because smaller particles in the feed descend in the co-current laminar air stream at a velocity which is closer to that of the larger particles than occurs in prior art processes utilizing spray towers. These smaller particles are thus subjected to less residence time in the puffing zone. Consequently, the smaller particles are puffed or expanded in more nearly the same ratio to that of the larger particles; and in contra-distinction to the known methods, the puffed product is not composed of particles of relatively uniform size, but rather has a PSD curve shape similar to that of the feed stock.

The laminar air flow utilized in the present invention also serves to overcome the product defects which are encountered in products manufactured by gun-type apparatus, and which are caused by the turbulence inherent in such devices.

Preferably, the height of the tower, and the temperature and velocity of the air stream, are such as to prevent complete dehydration, or fusing of the borax, and are such that they produce a product with a relatively uniform puffing ratio. It has been found that a stream velocity of less than about 5 ft/second, and an air temperature of between about 500° F. to 750° F. at the air inlet yields best results for a tower in which the fall zone for the borax feed powder is between about 40 and 60 feet.

In accordance with a further aspect of the invention, the borax feed powder is preferably introduced into the upper reaches of the tower as a dispersed flat sheet, by a rotating horizontal wheel having vanes which disperse the borax particles through an opening in the wall of the tower into the moving air stream. Two or more such wheels can also be used, e.g., at alternate ends of a diameter through the tower, in order to further encourage formation of a uniform feed sheet of particles. In order to assure laminar flow of the air stream, the air entering the tower passes through an air distribution plate or screen which increases the laminar flow of the air. The particles in the form of a sheet are carried by the air stream, and puffed particles are recovered downstream by gravitational separation. The resulting product is free-flowing and agglomerate-free. It requires no further treatment to render it free-flowing, or reduce particle size.

The invention, both the apparatus and method for carrying it out, will be described in connection with a specific embodiment illustrated in the accompanying drawings, which are illustrative only. Other modifications and embodiments, will be apparent to those skilled in the art. The invention is defined in the claims which follow this specification.

BRIEF DESCRIPTION OF THE DRAWINGS

In the drawings:

FIG. 1 schematically illustrates a vertical section of a tower used in the process for puffing borax according to the present invention;

FIG. 2 is a side view of the disperser wheel and drive motor, which are used in the tower of FIG. 1 for introducing the borax feed powder as a sheet of material;

FIG. 3 is a plan view of the disperser wheel;

In FIG. 1, a vertically oriented tower 10 is schematically shown, which tower, except as subsequently discussed, is a conventional spray tower of the type used in the prior art for drying of material such as detergents. Tower 10 typically has a height of about 60 feet and a diameter of 20 feet. Tower 10 is provided with an air inlet 12 into which air externally heated is introduced at a temperature in the range of from about 500° F. to about 750° F. The air passes through a distributor plate, or screen 14, where the air flow becomes increasingly laminar. The air stream continues gently downwardly in the tower and is exhausted at an outlet 16. The air temperature at the outlet is typically in the range of from about 250° F. to 375° F.

Figure 4:
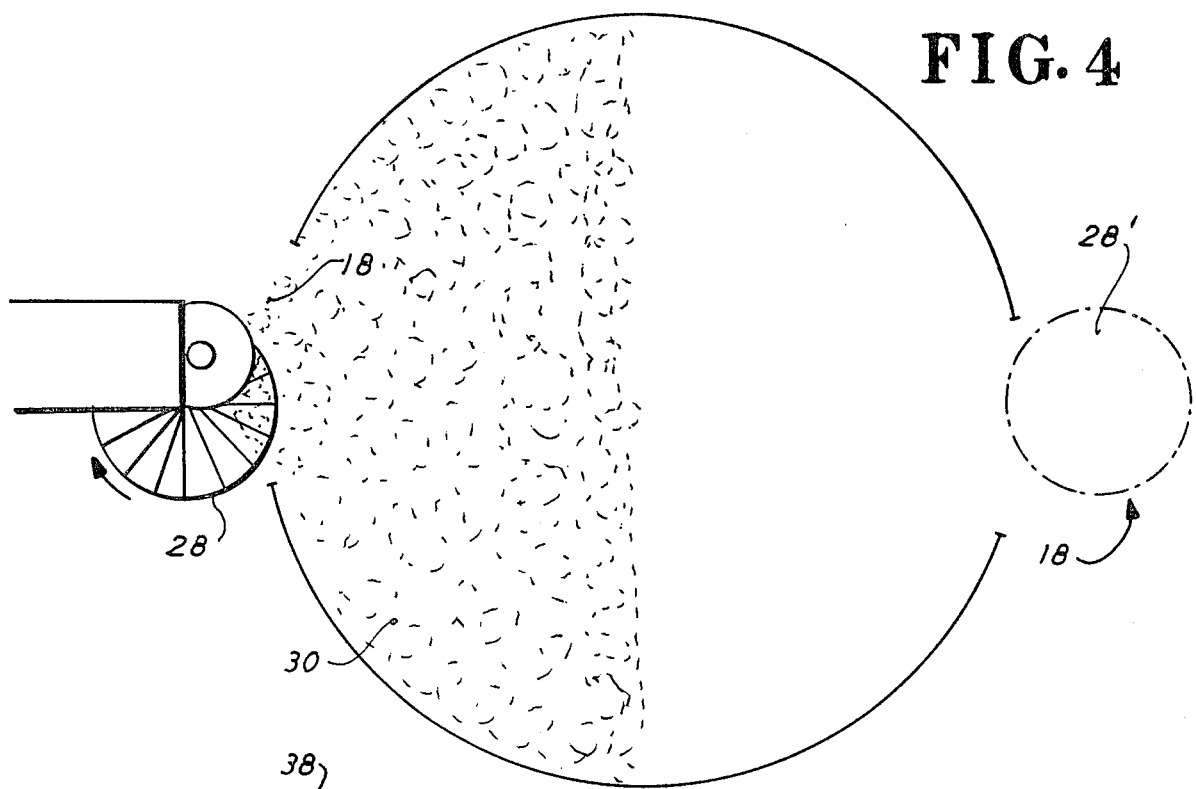
FIG. 4 is a transverse section through the tower of FIG. 1, showing the disperser wheel introducing the borax feed powder as a sheet of material.

Powdered borax feed is introduced into the air stream through an opening 18 in the wall of the tower from a feed hopper 20 where it drops into a variable speed conveyor belt 22 driven by a motor 24. After being carried by the belt, the borax powder is dropped into a concentrator funnel 26 onto a disperser wheel 28 (see FIGS. 3 and 4), driven by motor 29 which disperses the powdered borax as a substantially horizontal sheet 30. The introduced powder descends cocurrently with the heated airstream, and downstream from the point of introduction 18, passes through a discharge flap 34 and is gravitionally separated by being received onto a finished product conveyor belt 36.

As schematically illustrated in shadow in FIG. 4, an additional disperser wheel 28' can be positioned at an opening 18' at a point with respect to the wall of tower 10 which is diametrically opposed to wheel 28. Use of two such wheels assures a more thorough sheet formation of particles at the introduction zone.

The feed material preferably comprises commercially available powdered borax pentahydrate, $Na_2B_4O_7.5H_2O$, which contains about 31% water of hydration. Borax decahydrate i.e. $Na_2B_4O_7.10H_2O$, which contains 10 moles of water, can also be used as the feed.

Figure 5:
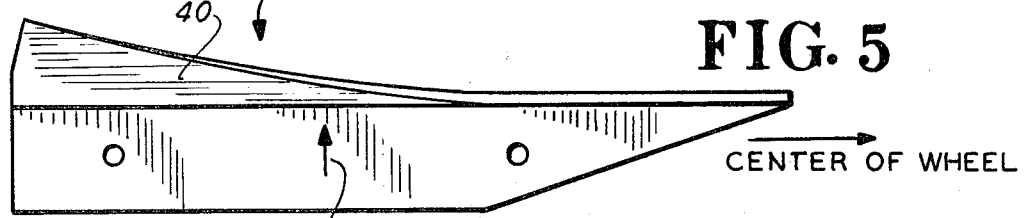
FIG. 5 is a top plan view of a vane of the disperser wheel.
Figure 6:
FIG. 6 is a side elevational view of the said vane.
Figure 7:
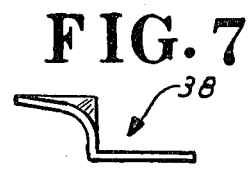
FIG. 7 is a left-end view of the vane.

As appears from FIGS. 2 and 3, the one or more disperser wheels 28 have a plurality of metal vanes 38 each of which has folded end 40 (shown in greater detail in FIGS. 5-7) forming a flap for spreading the powder as the wheel is rotated in direction 41. These vanes are mounted on a metal disc 42.

The air flow is preferably maintained at a low velocity of less than 5 ft/sec, and preferably from about 1 to 2 ft/sec. While the total fall zone for the particulate feed typically extends some 60 feet, i.e. for most of the height of tower 10, actual puffing of the particles only occurs at the limited puffing zone 32, the length of which is about 2 to 20 feet. The temperature in this zone 32 is about 500°-750° F., depending upon inlet temperature, air flow rates, dimensions, etc. At the bulk of the fall zone which is beneath the puffing zone, no further puffing occurs; but it appears that at least some rehydration occurs. Thus, if pentahydrate feed is used (31% water), at the bottom of the puffing zone there may be about 4 moles of water, a loss of about 8% by weight. However, rehydration beneath the puffing zone thereafter occurs, which produces an improved more uniform product. It should be appreciated that this result cannot be obtained where a countercurrent flow of air is utilized (as in U.S. Pat. No. 3,882,034), as the heat intensity increases in the direction of particle movement.

As those skilled in the art will readily appreciate the initial feed borax powder in hopper 20 has a given particle size distribution for each quantity placed in the hopper. The size of those particles is, of course, not uniform.

After the borax powder is placed in the descending air stream and puffed, the puffed particles emerging from the discharge flap 34 onto belt 36 also will not be uniformly sized, but rather will have a second particle size distribution, i.e. indicative of the sizes in the population of the puffed particles.

In accordance with an important aspect of the present invention, this second particle size distribution (PSD) will be generally similar in shape to the shape of the PSD curve for the borax feed stock. The reason for this may be appreciated by considering that where the feed particles descend in tower 10 solely under the influence of gravity, the dwell time at puffing zone 32 for the smaller particles would be much greater than would the dwell time of the larger particles. Indeed, if the flow of heated air through tower 10 were counter to the descending particles, such a disparity would be further augmented, the net result being to grossly overheat and overexpand the small particles preferentially.

In contrast, the method of the present invention lessens the dwell time for the smaller particles in zone 32, thereby minimizing overheating of same and assuring that the puffing (and dehydration) of the smaller particles is more nearly comparable to that of the larger particles.

Figure 8:
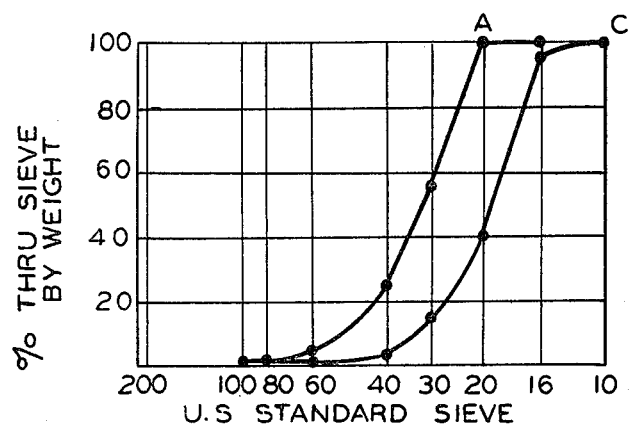
FIG. 8 is a graph showing particle size distribution curves for several products produced in accordance with the invention.

The last aspect of the invention is partially illustrated in FIG. 8, wherein PSD curves are plotted for two puffed borax products produced in accordance with the invention. In both instances, the same borax pentahydrate feed was passed through a sparay tower as in FIGS. 1 through 7. In the instance of curve A, the inlet temperature was 520° F. and outlet temperature 300° F. For the curve C material, inlet temperature was 685° F. and outlet 375° F. Air velocity was 2 feet/sec in both cases, and all other operating conditions were substantially identical. The product in curve A was found to have a density of 0.32 g/cm³; that of curve C, a density of 0.07 g/cm³. Thus, the product in C was considerably more expanded than in A. Nonetheless, it is seen that the two curves are virtually of identical shape, i.e. if displaced parallel to one another they would virtually overlap. The interence is that particles of differing sizes subjected to the process of the invention are nearly proportionally expanded.

That overexpanded material does indeed possess lower bead strength, has been established by an attrition test of puffed borax, wherein a light density material (0.08 g/cm³) having a high puff ratio, and an identical quantity of a higher density material (0.25 g/cm³) with a lower puff ratio, were each subjected to mixing in a laboratory P/K blender at 24 RPM for 20 minutes. The ratio of breakdown of the beads in the respective products was found to be about the same as the ratio of puffing; and the breakdown was almost 3 times higher in the lower density product. This shows that higher puff ratios yield materials with lower bead strength.

The product resulting from practice of the present invention is free-flowing and agglomerate-free. Consequently, the powder recovered by the belt 36 does not have to be subjected to any grinding operation to reduce agglomerates to finer particles.

While the invention has been described with reference to a particular embodiment shown in the drawing, other modifications will be apparent to those skilled in the art without departing from the scope of the invention as defined in the claims.

What is claimed is:

1. A method for producing a free-flowing, agglomerate-free puffed borax product having high bead strength, comprising the steps of:
   (a) establishing a top to bottom laminar flow of heated air through a vertical tower;
   (b) introducing hydrated borax particles at a given point in said heated laminar flow air stream to be carried by the air stream in the direction of flow for a time sufficient to produce said puffed particles; said hydrated borax particles being introduced into the air stream in the form of a horizontally dispersed sheet of particles; and
   (c) recovering the puffed particles downstream from the point of introduction of the particles.

2. A method of producing a puffed borax product as claimed in claim 1 wherein the air stream has a velocity of less than 5 ft/sec.

3. A method of producing a puffed borax product as claimed in claim 1 wherein the air stream is heated to a temperature sufficient to remove a portion of the water of hydration but below the temperature at which the borax fuses.

4. A method of producing a puffed borax product as claimed in claim 1 wherein the particles while being puffed are carried by the air stream a distance of about 2 to 15 feet.

5. A method for producing a free-flowing, agglomerate free puffed borax product having high bead strength, comprising the steps of:
   (a) introducing hydrated borax particles having a given particle size distribution into the upper end of a vertical tower in the form of a horizontally dispersed sheet of said particles;
   (b) introducing a low velocity downwardly moving laminar flow of air into said tower to intercept and carry with it the borax particles in said dispersed sheet;
   (c) said borax particles being carried in said air stream for a time sufficient to remove a portion of the hydrated water and to produce said puffed particles of borax; and
   (d) gravitationally separating the puffed borax particles at a point downstream from the point of introduction of the borax particles and recovering the same.

6. A method of producing puffed borax as claimed in claim 5 wherein the hydrated borax particles are introduced into the tower by one or more wheels having vanes disposed in a horizontal plane, the output from rotation of a said wheel passing through an adjacent opening in the wall of said tower to generate said sheet of particles.

7. A method of producing puffed borax as claimed in claim 5 wherein the air stream is heated before entering said tower and is passed through means to increase the laminarity in the flow thereof.

8. A method of producing puffed borax as claimed in claim 5 wherein the air stream is heated to a temperature at which water of hydration is partially removed but below the fusing temperature for the said borax.

9. A method of producing puffed borax as claimed in claim 5 in which the air is heated to a temperature of about 500° to 750° F.

10. A method of producing puffed borax as claimed in claim 5 in which the particles while being puffed are carried in the air stream a distance of about two to fifteen feet.

11. A method of producing puffed borax as claimed in claims 5 or 10 wherein the velocity of the air stream is less than 5 l ft/sec.

12. A method for producing a free-flowing, agglomerate-free puffed borax product having high bead strength, comprising the steps of:
   establishing a top to bottom low velocity laminar flow of heated air through a vertical spray tower;
   continuously introducing hydrated borax particles as a dispersed substantially horizontal sheet into said heated laminar flow air stream at the upper end of said tower;
   permitting said borax particles to descend in said tower under gravity and in co-current relation to the said flow of heated air through said tower;
   said particles passing in their vertical descent through a puffing zone extending a vertical distance of from about 2 to about 15 feet in said tower; and
   gravitationally separating the puffed borax product and recovering same at the lowermost output end of said spray tower.

13. A method in accordance with claim 12 wherein said dispersed sheet is formed by one or more dispersing wheels mounted at the wall of said tower, said wheels being in a horizontal plane and the output from rotation of said wheels passing through one or more corresponding openings in the wall of said tower to generate said sheet of particles.

14. A method in accordance with claims 12 or 13 in which said air is heated externally to said tower, introduced to said tower through an input duct at the top end of said tower, and then passed through means to increase the laminar flow thereof.

15. A method in accordance with claims 12 or 13 wherein the input temperature of said heated air is in the range of from 500° F. to 750° F. and the output temperature is in the range of from 250° F. to 375° F.

16. A method in accordance with claim 13, wherein the fall zone through said spray tower is from 40 to 60 feet.

* * * * *